United States Patent [19]

Martyr

[11] Patent Number: 4,866,242
[45] Date of Patent: Sep. 12, 1989

[54] LASER BEAM WELDING

[75] Inventor: David R. Martyr, Newcastle upon Tyne, Great Britain

[73] Assignee: British Shipbuilders, Newcastle upon Tyne, Great Britain

[21] Appl. No.: 14,974

[22] Filed: Feb. 17, 1987

Related U.S. Application Data

[63] Continuation of Ser. No. 604,079, Apr. 26, 1984, abandoned.

[30] Foreign Application Priority Data

Apr. 20, 1983 [GB] United Kingdom ............... 8310630
Apr. 20, 1983 [GB] United Kingdom ............... 8310631

[51] Int. Cl.⁴ ............................................. B23K 26/00
[52] U.S. Cl. .......................... 219/121.64; 219/121.84; 219/121.72
[58] Field of Search ............... 219/121 LM, 121 LC, 219/121 EC, 121 ED, 121 LD, 121 FS, 121 PS, 121 LV

[56] References Cited

U.S. PATENT DOCUMENTS

| | | | |
|---|---|---|---|
| 4,377,735 | 3/1983 | Minamida et al. | 219/121 LD |
| 4,424,435 | 1/1984 | Barnes, Jr. | 219/121 LD |
| 4,507,540 | 3/1985 | Hamasaki | 219/121 LD |
| 4,546,230 | 10/1985 | Sasaki et al. | 219/121 LC |
| 4,603,089 | 7/1986 | Bampton | 219/121 LD |
| 4,634,832 | 1/1987 | Martyr | 219/121 LD |
| 4,642,446 | 2/1987 | Pennington | 219/121 LD |

Primary Examiner—M. H. Paschall
Attorney, Agent, or Firm—Robert C. Podwil

[57] ABSTRACT

A 3-25 mm metal plate 22, 27, usually ferrous, is welded by a heavy-duty laser (5-25 kw) which melts through the plate and into a support member 24, 31 below to give a unitary weld. A gas supply to the laser beam focus is provided such that on the one hand the plasma is retained at least partially near the weld pool to give good energy transfer and on the other the plasma does not all escape.

7 Claims, 3 Drawing Sheets

LASER BEAM WELDING

Cross-References to Related Applications

This Application is a Continuation in part of my earlier application Ser. No. 894,732, filed Aug. 8, 1986 (now abandoned), which was a continuation of my application Ser. No. 604,079, filed Apr. 26, 1984 (also abandoned).

BACKGROUND OF THE INVENTION

This invention relates to welding and more especially to welding of metal usually but not invariably ferrous metal in the form of plate or structural members.

A common welding requirement, with which the present invention is particularly concerned is the welding of one plate to another, at, or almost at, a right-angle configuration, i.e. a "T" weld.

Typically, this is effected by creating a weld "fillet" along each internal corner, which necessitates two runs. The need to angle or bevel the attached plate corners to improve weld penetration also arises if heavy gauge plate is used. Similar techniques are used when a rolled or fabricated section is to be attached by welding to a face of a plate.

The deep penetration characteristics of high-powered laser beams have led them to be considered as a source of energy in welding processes. Our copending Application based on British applications Nos. 83 10630, 83 10631 and 83 10632 (now U.S. Pat. No. 4,634,832, issued Jan. 6, 1987); entitled "Laser-Brem-welding" describes such a process particularly adapted to use in workshops or site conditions. The process involves the use of an impingement member such as a wire so that any gaps in the fit-up between the plates to be welded do not lead to a loss of energy due to escape of the focussed laser beam through the gap, i.e. without energy transfer and plasma formation. The method of the prior invention can be applied both to butt welding and to T-welding.

The present invention sets out to provide a novel technique of welding utilising the deep penetration of a finely focussed laser beam to achieve melting and welding of a T-section, or like, weld under actual workshop or site conditions, in which the members to be welded are not necessarily so accurately prepared as to provide a tight-welding fit, nor so thin grade material that they can be forcibly damaged into tight abutment, but from time to time may exhibit gaps along the weld line to be produced.

In one aspect the invention consists in a method for welding a metal plate to an underlying attachment member, which in different parts of a mutual attachment region can be contacting or in close but non-contacting proximity to the plate: contacting or in close proximity to the plate: in which a high energy laser beam is focussed upon the plate and is moved along relative thereto at the other side of the plate from the said mutual attachment region contact area, characterised in that a supply of gas is directed to at least partially confine the plasma formed, whereby the focussed beam melts the metal both of the plate and of the underlying member so that upon solidification a weld line is formed, and in that a filler wire is provided for feed into the focussed beam at a rate required to fill any gaps between the plate and the member.

Usually, both the plate and the underlying member are ferrous. By "plate" is generally understood material at least 3 mm thick; however, thicknesses to as thin as 1 mm may also be used. We have found that from 3 to 25 mm is preferred and that a laser of 5 to 25 kw intensity can be utilised.

The underlying member is expected to be spaced from the plate in some places and not others. The filler material is valuable since when molten it will flow to locally fill any such space to improve weld characteristics, especially by filling any gaps open to the outside, where corrosion can start if necesssary by making a number of through welds.

The relationship between the plate and the underlying attachment member can be that of a "T" weld, i.e. a weld where the underlying plate is placed at, or nearly at, right-angles to the upper plate. The weld then passes into the end face of the underlying plate, in a single deep penetration pass, giving a "through-welded" joint of unique form.

An alternative relationship is that where the underlying attachment member has been formed to contact as a lip or margin parallel to the underside of the upper plate. The width of the formed lip may permit two or more parallel "through welds" according to the invention to be formed.

Another alternative relationship is of course that of two overlapping but generally parallel plates. Other relationships can also be envisaged, as shown in more detail below.

The upper plate utilized for a T-weld is more preferably from 2-15 mm in thickness for laser power up to 20 kw; the underlying plate may be of any thickness.

We are aware that GB Pat. No. 1 268 044 describes a laser welding process which pierces through an upper sheet of material, usually as spot welding. The process therein described utilises the technology then available, i.e. lasers of lower power, and carries out the process on thin sheet. It recognises an inherent limitation in the process, namely that the power density of the radiation must be kept below a ceiling value to avoid vaporisation to such an extent that there is insufficient material left to form a weld. Moreover, it is concerned with thin material, 0.38 mm sheet being given by way of example, in which thermal conduction problems, and weld characteristics, are different from those obtainable with thicker material. Thus, application of the process of this prior Patent to thicker grades of material is contraindicated.

Thicker grades of material also present the problem that when superposed they can exhibit gaps due to inevitable minor imperfections in cutting or shaping, and that it is unduly laborious and expensive except under laboratory conditions to remove these gaps, e.g. by machining or clamping of such heavy grades of metal into perfect face-to-face contact. In particular, a continuous weld (as compared to spot welds as described in the G.B. Pat. No. 2 268 044) is required to traverse and join some portions of the mutual metal-to-metal contact areas which are in good close contact and others which are spaced apart to a variable extent. The present invention achieves this by feed of a continous length of material such as wire, provision being made for varying the effective speed of material feed as needed to provide molten material to locally fill the gaps as, if, and when encountered.

Feed of such lengths of material e.g. wire also provides a further advantageous feature of the invention. The laser beam is focussed on the support plate and melts a hollow conical shape with molten walls down through this plate into the underlying structure. As the beam is traversed this shape, called a "keyhole", moves along. If the plate and underlying structure are in close contact the "keyhole" stays the same shape as it moves, leaving in its wake a solified weld structure. If a gap arises between the plate and the underlying structures, some of the molten metal will run from the keyhole walls into the this gap. This changes the keyhole internal shape, and thus the location of vapour or plasma zones in and above the keyhole. Consequently, impingement of the beam is altered and heat transfer to the keyhole is changed. However, feed of the filler material to a position at or near the beam focus means not only that additional molten material is provided, and can flow to fill the space but also that the beam impingement on the wire remains relatively constant, with improved uniformity in operation.

It will be seen therefore that, as in the invention of our copending application Ser. No. 601424 referred to above, gas supply to the weld zone, which is of crucial importance, will act upon a more uniform generation of vapour and/or plasma to achieve its controlling function.

When its form of maximum penetration is needed, according to the present invention, high-powered lasers are being used to the limits of their performance. A balance of welding speed and control of plasma escape is essential, on a considerably larger scale than hitherto, and this is provided by gas supply by means of which a trade-off between speed and depth can be achieved.

BRIEF DESCRIPTION OF DRAWINGS

The invention will be further described with reference to the accompanying drawings, in which.

DETAILED DESCRIPTION

Figure 1:
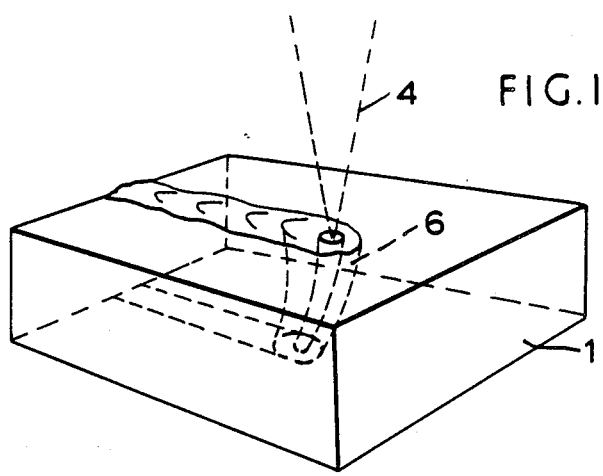
FIG. 1 is a perspective view of theoretical laser welding of two plate portions in a single pass, operating from above.

FIG. 1 shows a plate 1 along which, in the line shown, there impinges a laser beam 4, focussing at or near the surface. Energy in the beam vapourises a "keyhole" through the material with the vapour pressure in the "key-hole" sustaining the molten walls 6. In practice, the vapour is prevented at least in part from escaping out of the top of the "key-hole" (where it could form a laser-blocking plasma) by a controlled jet of helium (see FIG. 2). As the beam is moved along the plate the "key-hole" moves. The beam melts materials ahead of the orifice, and material solidifies behind the orifice. A deep penetration weld can be formed usually in one pass.

Figure 2:
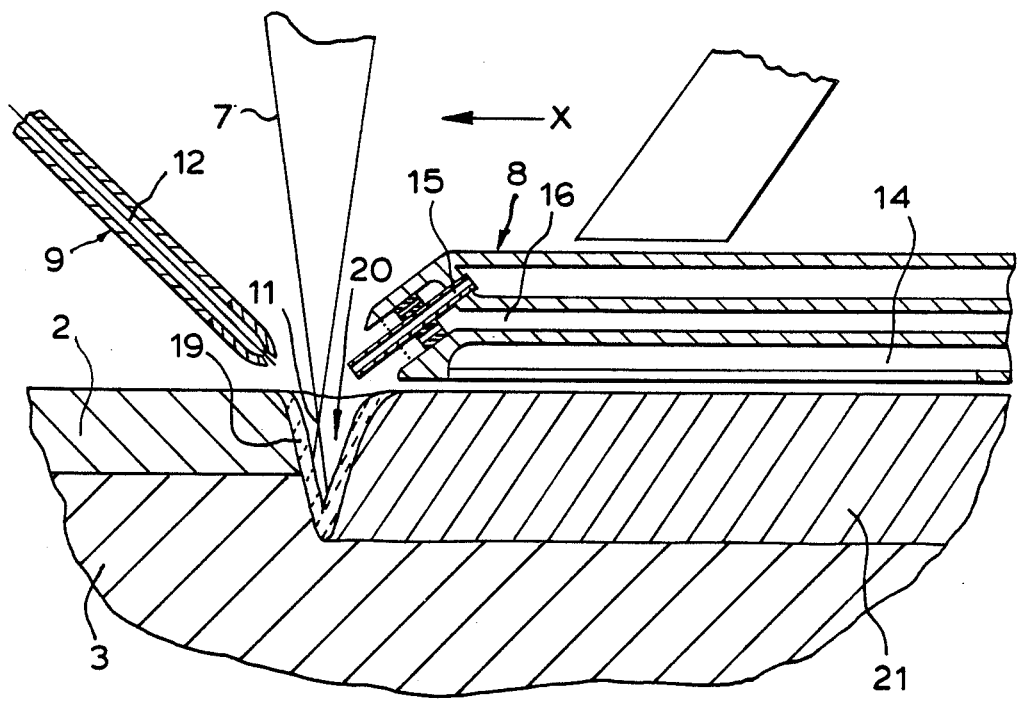
FIG. 2 is a section through equipment which can be used in accordance with the invention, taken along the weld line.

FIG. 2 shows a diagrammatic section along a weld line of essential features of equipment which can by way of example be used to carry out the method of the invention.

The laser beam 7 impinges on the plate 2 with its focus at or near the top metal surface. A consumable wire 12 can be fed to, or near the focus 10, to control the weld profile and penetration, and to fill gaps arising e.g. when the members to be welded are slightly spaced apart. Impingement of the beam upon the metal of the plate 2 causes metal vapour to be produced and a plasma to be formed. Gas hood 8 supplies a shielding gas such as helium gas or a helium-based mixture through base channel 14, central duct 15, and surrounding duct 16, in a gas-flow configuration such as to confine the plasma i.e. so as neither to sweep it completely away nor allow it to block beam access to the keyhole. British Patent No. 1 591 793 describes a typical such hood in more detail. Impingement of the beam on this plasma at focus 10 absorbs energy which is transferred to the surrounding metal and continuously forms molten walls 19 defining "key-hole" 20 extending down through the plate 2 and into the underlying member 3. The molten walls progressively solidify at weld 21, joining the two members 2 and 3. The supplied wire 12 also provides a suitable point of inpingement of the beam and provides molten filler material as described below.

Figure 3:
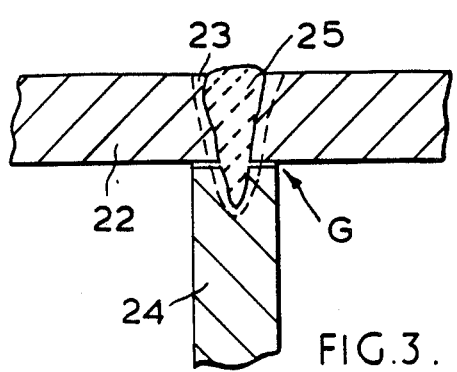
FIG. 3 shows the structure of a "through-weld" in accordance with the invention, embodied as a T-weld.

FIG. 3 shows that the weld material 25 is of a characteristic shape, being broader at the top, slightly bulbous in the centre, and tapering to a point. It is surrounded by a narrow zone of heat-affected metal 23. The weld firmly attaches the plate 24 to the underside of the plate 22, even though only a single pass per run from above has been used. In practice, and as facilitated by this invention, weld metal plus melted filler wire is allowed to run into gap G, as, if and when such gaps arise, to give a configuration shown in FIG. 3a, i.e. with no open fissures to initiate corrosion.

Figure 4:
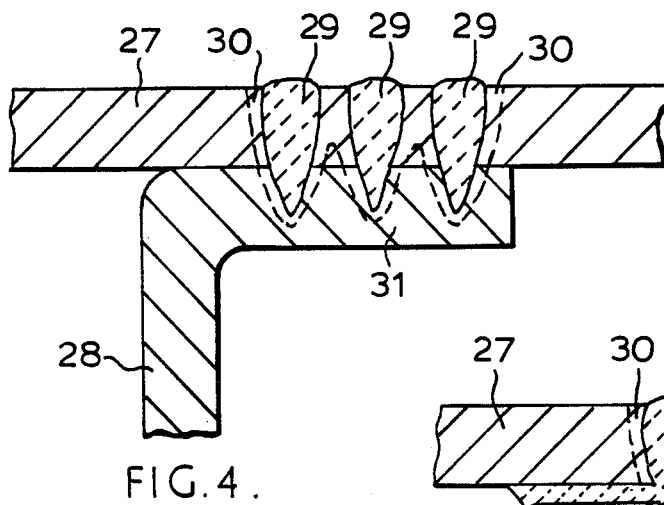
FIG. 4 shows the structure of a similar weld attaching the lip of a strengthening bar or girder to the underside of a plate, involving more than one such "through weld"

For those instances where the strength of a weld configuration as shown in FIG. 3 may be inadequate, it is possible to operate as shown in FIG. 4. In this Figure a plate 27 is attached to an underlying strut or girder 28 by three parallel welds 29 as shown. Each weld extends through the top plate and into a lip 31 of the girder 28. The welds are collectively surrounded by areas of heat-affected metal 30 as shown. If desired, welds 29 can completely penetrate not only the top plate 27 but also the lip 31, and be visible upon the back of the lip.

Figure 3A:
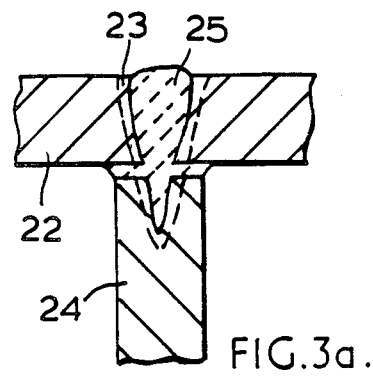
FIG. 3a shows the preferred sectional form of the welded structure.
Figure 4A:
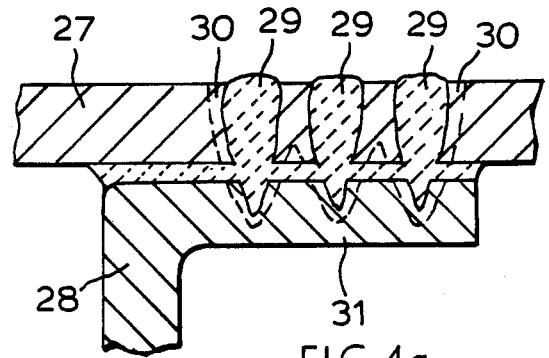
FIG. 4a shows the structure of FIG. 4 at a region where the lip and plate were spaced apart, as in FIG. 3.

FIG. 4a, analogously to FIG. 3a, shows a gap between the plate 27 and girder 28 filled with molten metal, and indicates that the gap can have a relatively large volume necessitating application of much molten filler wire material.

Figure 5:
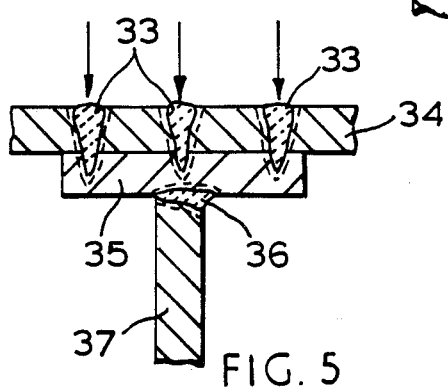
FIG. 5 shows a hybrid weld structure utilising welding in accordance with the present invention together with a weld of a type described in our copending Application referred to above.
Figure 5A:
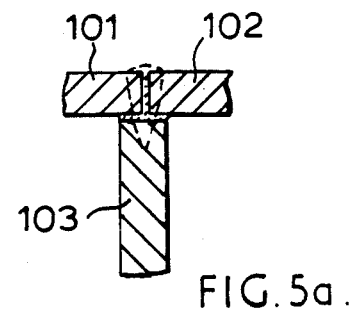
FIG. 5a shows a further hybrid weld structure.

FIG. 5a shows the plates 101 and 102 abutted as closely as possible, although in workshop practice gaps may arise. They can be jointly welded together, and to plate 103, in a single pass forming a weld as shown by dotted lines.

FIG. 5 shows three welds 33 in accordance with the present invention between a top plate 34 and a underlying plate 35. This underlying plate is in turn welded with a T-weld 36 to a plate 37 at right angles, using the laser techniques described and claimed in our copending Application referred to above and involving the use of a beam-interceptor material.

Figure 6:
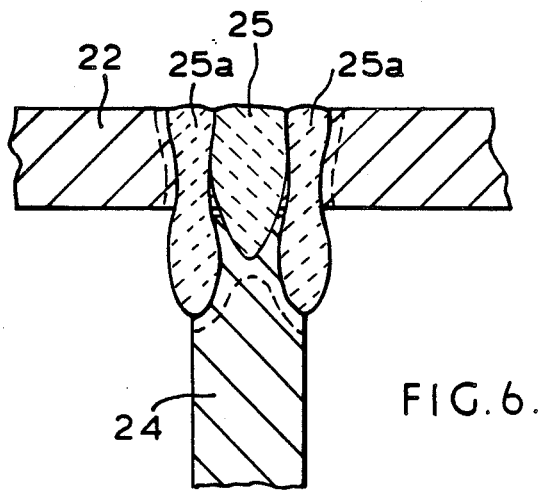
FIG. 6 shows a further variant weld form in accordance with the present invention.

FIG. 6 shows a further variant of weld in accordance with the invention. In this, using the references of FIG. 3, the upper plate 22 is secured to plate 24 not only by central weld 25 but also by two side welds 25a themselves visible along the internal corners of the T, and utilising a filler wire to improve weld profile.

Figure 7:
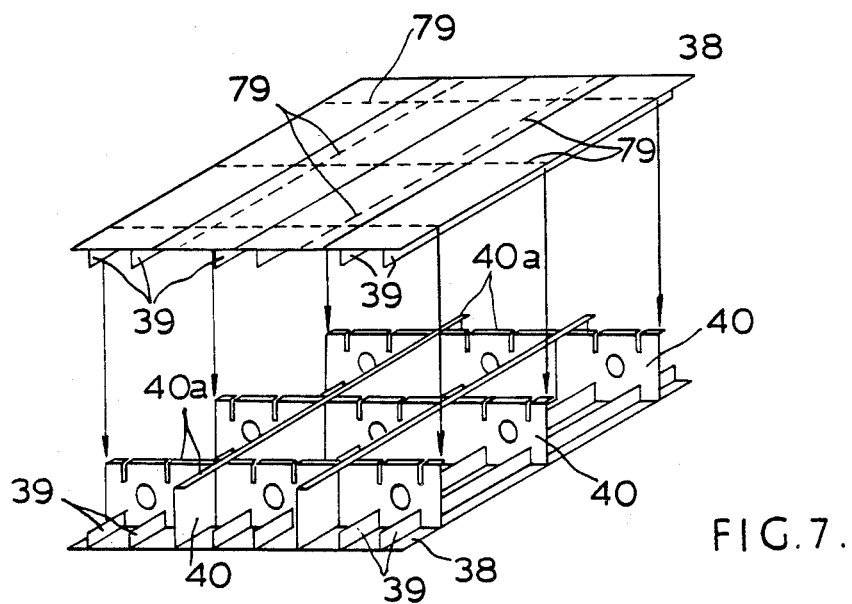
FIG. 7 shows a practical use for the weld technique of the present invention.

FIG. 7 shows assembly of a frequently encountered sub-unit utilised in ship-building. It comprises a plate 38, itself built up by butt-welding of strips, those welds being omitted for clarity. On the plate are welded parallel stiffeners 39. Over the stiffeners are welded deep webs 40, each apertured to receive stiffeners and each with an upper formed lip 40a; some webs cross the stiffeners 39 and some run parallel to them.

Such a unit may be made by handwelding or by the techniques, and on the assembly line, described in our co-pending Application referred to above.

The unit is to be further assembled to another sub-assembly of plate 38 and stiffeners 39 as shown. Hitherto, this has involved difficult techniques of "overhead" welding in inconvenient locations. However, using the techniques of the present invention "through-welds" can be made through the upper plate with minimum handling and inconveniece.

I claim:

1. A method for welding ferrous metal plate of at least 1 mm thickness to an underlying ferrous attachment member, there being gaps between the plate and the underlying member at some places but not others, comprising the steps of: focussing a laser beam upon the plate at the other side of the plate from the said attachment member so as to melt both the metal of the plate and that of the attachment member underlying the plate; feeding to the focussed beam an elongate body of filler material whereby said material is also melted; directing a supply of gas to at least partially confine the plasma formed; moving the beam along the plate, over the position of the attachment member at a rate such that molten material solidifies as a weld line in the path of travel behind the beam; and causing during such travel molten material to flow from the molten weld into any gaps from time to time encountered to either side of the weld line and between said plate and said attachment member, said step of causing material to flow into any gaps comprising feeding the filler material at such a rate as to provide molten material sufficient to fill the gaps.

2. A method as claimed in claim 1 in which the underlying attachment member is a plate arranged at right angles to the upper metal plate so as to define the stem of a T-shaped configuration, and the weld passes into the end face of the underlying attachment member.

3. A method as claimed in claim 1 in which the underlying attachment member is a plate arranged at right angles to the upper metal plate so as to define the stem of a T-shaped configuration, and three welds are used, one passing centrally into the end face and the others, located to either side of the central weld passing.

4. A method as claimed in claim 1 in which the plate is welded in at least one pass to a lip formed on the underlying attachment member.

5. A method as claimed in claim 1 in which two overlapping plates are welded in at least one pass.

6. A method as claimed in claim 1 in which the laser beam has an intensity of from 5 to 25 kW.

7. A method as in claim 1 in which the ferrous metal plate has a thickness of between 5 to 25 mm.

* * * * *